Dec. 6, 1927.

M. H. PEACOCK

SIGNAL

Filed Feb. 13, 1924

1,651,408

3 Sheets-Sheet 3

Inventor
Marshall H. Peacock
By his Attorneys

Patented Dec. 6, 1927.

1,651,408

UNITED STATES PATENT OFFICE.

MARSHALL H. PEACOCK, OF DETROIT, MICHIGAN.

SIGNAL.

Application filed February 13, 1924. Serial No. 692,529.

This invention relates to signals, such as "stop" signals for automobiles, and is illustrated as embodied in an automobile having a tail light and means controlled by the brake pedal to cause the tail light to flicker to serve the purpose of a "stop" signal. From one point of view, it will be seen, an object of the invention is to provide means for utilizing the tail light of an automobile as a "stop" or equivalent signal, while from a different point of view the invention may be regarded as directed to the provision of automatic means for periodically varying the current for a signal of any character at a sufficiently slow rate to make the flickering action distinctive.

In one desirable arrangement, a current-varying device is moved back and forth by the alternate expansion and contraction of a heat-sensitive member, for example a nichrome wire or a bi-metal blade, under the influence of heat developed periodically by the periodically-varied current. Thus the heating of such a nichrome wire, and its consequent expansion, is utilized in one modification of the invention to release a spring vibrator to break the circuit, or to shunt the circuit into a different path, whereupon the wire cools and in cooling contracts and draws the vibrator back to its original position. Preferably the vibrator is held by a small electro-magnet until a considerable tension is set up in the vibrator, whereupon the vibrator moves suddenly to break the circuit cleanly and without arcing.

Figure 1:
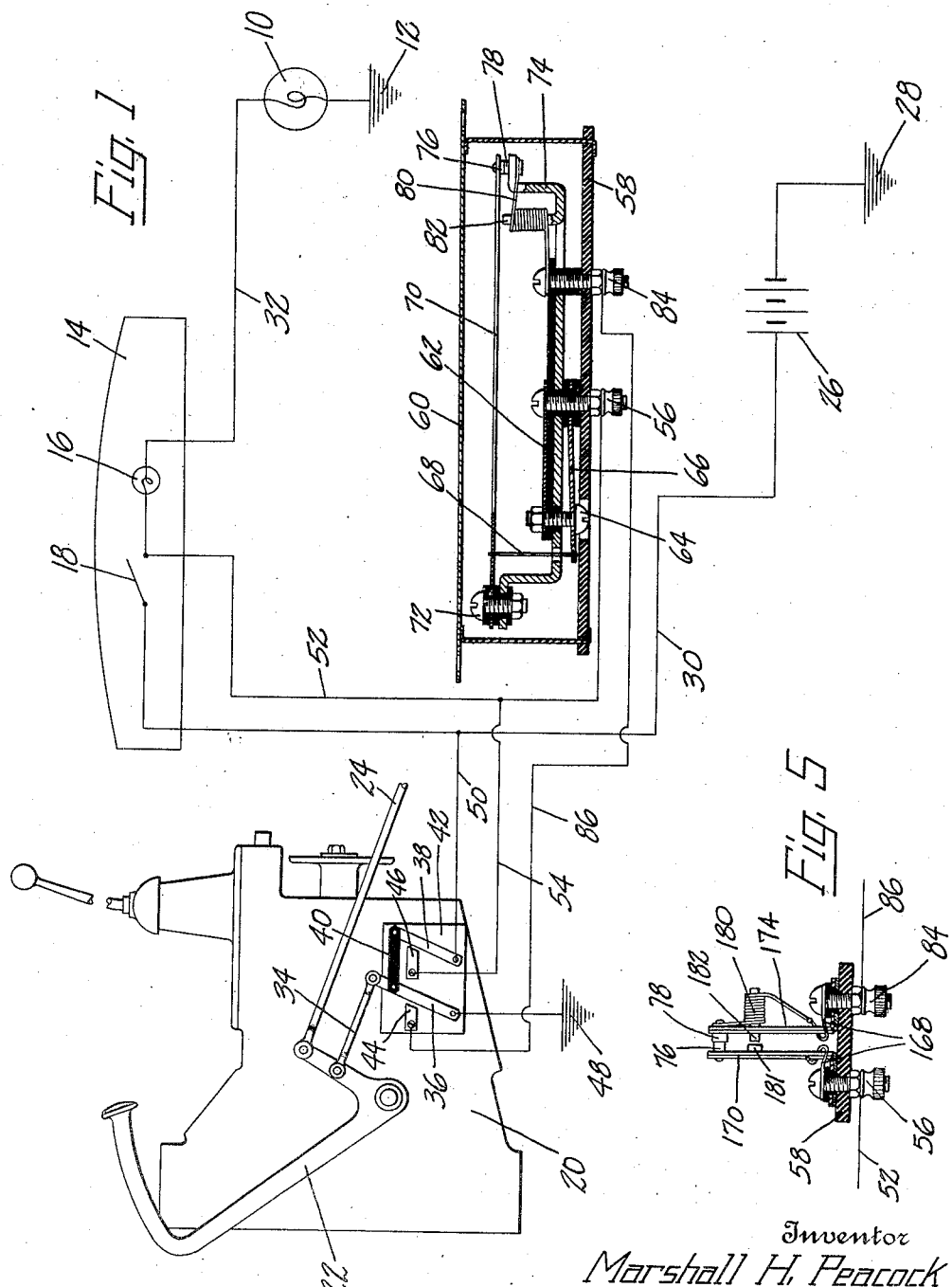
Figure 2:
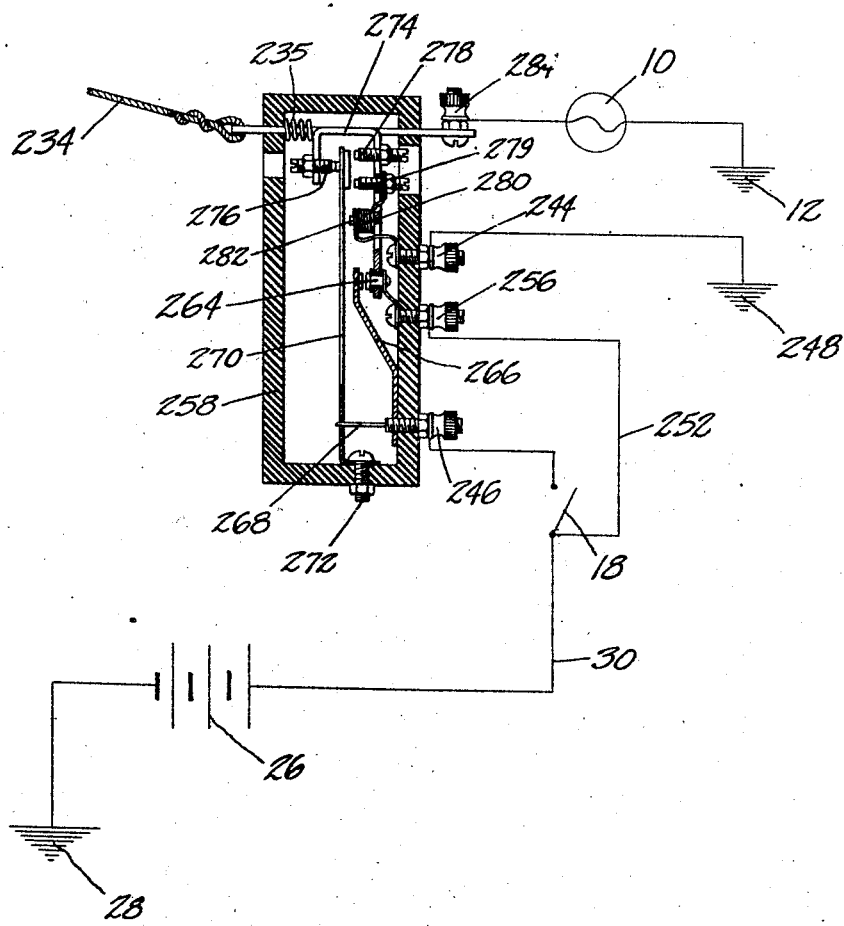
Figure 3:
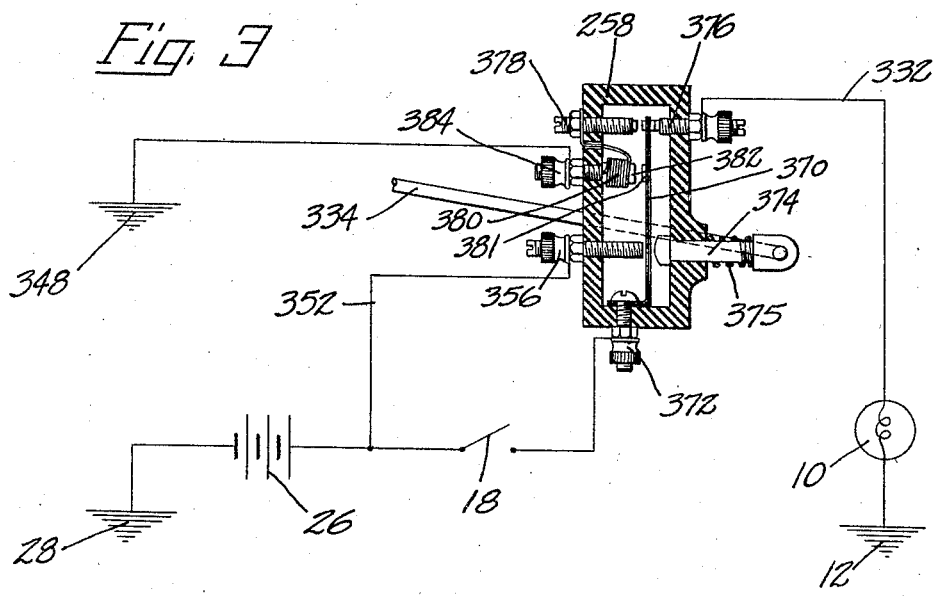
Figure 4:
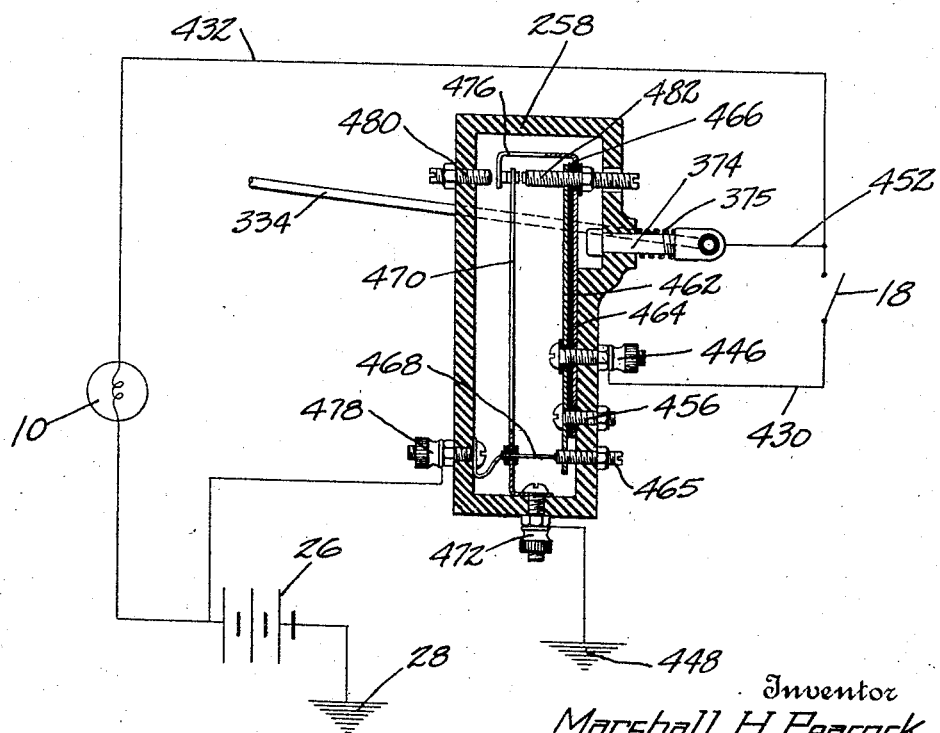

The above and other objects and features of the invention, including various novel combinations and desirable particular constructions, will be apparent from the following description of several illustrative embodiments shown in the accompanying drawings, in which:

Figure 1 is a diagram showing one modification of the invention embodied in an automobile;

Figures 2, 3, and 4 are similar diagrams showing respectively three other modifications; and Figure 5 is a view showing a possible modification of the heat-responsive device of Figure 1.

In Figure 1, the invention is shown as embodied in an automobile having a tail lamp 10 grounded at 12, an instrument board 14 which may have a dash light 16 in series with the tail lamp and on which is mounted a tail light switch 18, and a transmission 20 on which is mounted a brake pedal 22 having a connection 24 to the brakes. Current for the tail light circuit is provided by a battery 26 grounded at 28 and connected by a wire 30 to the switch 18, which is connected to tail lamp 10 by a wire 32.

According to the present invention, the brake pedal, or an equivalent controlling member, is connected by an insulating link 34 to a double switch comprising parallel arms 36 and 38 connected by an insulating link 40 and pivoted on an insulating plate 42 on the transmission 20. When the brakes are on, arms 36 and 38 engage respectively contacts 44 and 46 on the insulating plate 42. Arm 36 is grounded at 48, and arm 38 is connected by a wire 50 to the tail light wire 30.

Shunted around the switch 18, so that the signal operates equally well whether the tail light is on or off, is a wire 52 connected by a wire 54 to contact 46, the wire 52 also being directly connected to a binding post 56 on an insulating plate 58 forming the cover of a switch casing 60. A plate 62 connects the binding post 56 to an adjusting screw 64 arranged to move back and forth a stiff spring 66 which serves to conduct the current to a nichrome or other thermally-sensitive wire 68, to vary the position of the wire. The nichrome wire 68 is connected at its opposite end to a spring steel vibrator 70 held at one end by a clamp screw 72 insulated therefrom, and which secures it to a sheet iron carrier 74 from which it is insulated, and which is secured to the cover 58 by binding post 56 but which is insulated from the binding post and from plate 62 and adjusting screw 64, and which does not touch wire 68. Vibrator 70 carries a contact point 76 which, when the nichrome wire 68 is cool and contracted, engages a contact 78 on the carrier 74, the contact 78 being connected to a wire 80 coiled around a finger 82 bent up from the carrier 74, to form a small electromagnet attracting vibrator 70, the wire then being connected to a binding post 84. Binding post 84 is connected by a wire 86 to contact 44 on the transmission.

The parts are normally in the positions shown in the drawings, the tail light either being off or burning steadily, according to the position of switch 18. If now the brake pedal is depressed, wires 50 and 54 are connected by arm 38, and wire 86, and therefore contact 78, are grounded through arm 36. The current from battery 26 now has several shunt or parallel paths to follow. First, if switch 18 is closed, it can pass to ground 12 through light 10. Second, whether switch 18 is open or closed, it can pass by way of wires 30 and 50 through arm 38 and contact 46 to wires 54, 52, and 32, and thence through the light 10 to ground 12. Third, it can pass through wires 30 and 50, arm 38, contact 46, wires 54 and 52, to binding post 56, thence through plate 62, adjusting screw 64, spring 66, nichrome wire 68, vibrator 70, wire 80, binding post 84, wire 86, contact 44, and arm 36, to the ground 48. Of these three paths, the third is of least resistance and consequently carries most of the current, and in an automobile lighting circuit, as is well known, under these circumstances the light, in this case the tail lamp 10, is dimmed. Passage of this heavy current through the nichrome wire 68 heats and expands the wire, permitting the vibrator 70 to pull away from contact point 78 except as resisted by magnet 82, so that as soon as the resistance of the magnet is overcome the vibrator breaks the contact 76, 78 suddenly, without arcing. This breaks the third of the above-enumerated circuits, sending all the current through the lamp 10 and causing it to burn brightly, and at the same time permitting the nichrome wire 68 to cool off. As the wire cools, it contracts and pulls vibrator 70 down until contact is re-established at 76, 78, whereupon the above-described cycle is repeated. Thus the tail light flickers, being periodically bright—dim—bright—dim, to warn the driver of a following car that the brakes have been applied.

It is to be understood of course that the wiring used in this device is of the small gage ordinarily employed for such purposes, usually No. 16. The closing of the circuit to ground in parallel with the tail light circuit causes the current flowing from the battery to the point of connection with lead 50 to divide, as previously explained, the greater proportion going directly to ground. In effect the tail light is short circuited. At no time is the battery short circuited because of the material resistance of the portion of lead 30 between the battery and the point of connection with lead 50 and also because of the resistance of the parallel paths beyond the branching point.

In the forms shown in Figs. 2 and 3, it will be noted that the thermal element lies between the battery and the branch point so that its effect is to further limit the total amount of current which may pass from the battery. This arrangement of the thermal element is described and claimed in my later copending application, Ser. No. 120,702, filed July 6th, 1926.

Figure 5 shows a possible modification of the circuit of Figure 1, in which, in place of the vibrator 70, there are two bi-metal blades 170 and 174 which are heated by nichrome wires 168 when the current is passing, in such a manner as to pull apart to break the third circuit, after overcoming the resistance of an electro-magnet 182 formed by a coil 180, and which is carried by one of the bi-metal blades and which attracts an iron armature 181 carried by the other bi-metal blade.

The arrangement shown in Figure 2 is intended to produce a cycle including one position wherein the light is turned off entirely, the complete cycle being dim—bright—off—dim—bright—off. In this arrangement application of the brakes operates through a cable 234 to pull a carrier 274 toward the left against the resistance of a spring 235, the cable 234 being connected to the brake pedal through a suitable spring link which permits the pedal to be depressed further after completion of the movement of carrier 274.

Before the depression of the brake pedal, if the tail light switch 18 is closed, the circuit is from battery 26 through wire 30 and switch 18 by way of a binding post 246 and the nichrome wire 268, through spring vibrator 270 clamped by screw 272 to insulating casing 258, through contact member 276 adjustably threaded into an arm of carrier 274, and through the binding post 284 to the lamp 10 and ground 12.

When the brake pedal is depressed, carrier 274 is shifted to the left, breaking the contact with member 276, and making contacts between the spring vibrator 270 and two contact members 278 and 279, and also making a contact between a member 264, carried by but insulated from an arm of carrier 274, and a spring 266 connected to binding post 246 and nichrome wire 268. Member 264 is connected by a flexible wire to a binding post 256, which in turn is connected to wire 30 by a connecting wire 252.

The current now has four paths to follow, there being a path through switch 18 directly to binding post 246 and a shunt path to close the circuit regardless of whether switch 18 is open or closed, this being by way of wire 252, binding post 256, member 264, and spring 266, and there also being two paths beyond the vibrator 270. One of these two latter paths is from the vibrator 270 through adjustable contact member 278 and binding post 284 to the lamp 10 and ground 12. The other is through adjustable contact 279, by way of coil 280 forming a magnet 282 and binding post 244 directly to the ground 248. This last is the path of least resistance, so that at this time the light is dimmed, although there is a heavy current flowing which heats the nichrome wire 268 and causes it to expand and release the vibrator 270.

At first the magnet 282 holds the vibrator, but, as soon as the tension is sufficient, the magnet is overcome, contacts with members 278 and 279 are broken, and contact with member 276 is reestablished, causing the light to burn brightly, but with a small current flowing, so that nichrome wire 268 can cool and contact. A small contraction breaks the contact with member 276, after which the circuit is entirely broken, the light being "off", until contact is reestablished with members 278 and 279 to cause the light to burn "dim". Thus the cycle is dim—bright—off—dim—bright—off, as explained above.

The modification shown in Figure 3 is intended to cause the light 10 to flicker by turning it alternately off and on by the use of a bi-metal blade 370, while the modification shown in Figure 4 secures the same result by the use of a nichrome wire or the equivalent 470.

In Figure 3, when the switch 18 is closed and the brakes are not on, the current passes by way of the combination binding post and clamp screw 372, through the bi-metal blade 370 and contact member 376, to wire 332 leading to the lamp 10 and ground 12. The current at this time is held down by the lamp 10 so that blade 370 is not heated sufficiently to operate it.

When the brake pedal is depressed, it acts through a spring link to pull on link 334 to move a plunger 374 toward the left against the resistance of a spring 375, to break the contact with member 376 and make a contact with a contact member 378, at the same time clamping the blade 370 between the plunger 374 and an adjustable binding post 356. The light circuit is now broken, the lamp being "off", and a heavy current is flowing through the bi-metal blade 370 by way of wire 352 and binding post 356, and also, if switch 18 is closed, by way of binding post 372, this current flowing through contact member 378 and coil 380 of magnet 382, which magnet cooperates with an armature 381 on the blade 370 and which magnet also serves as a binding post for a wire grounded at 348.

The heavy current now flowing heats the blade 370 and when the resistance of magnet 382 is overcome, the tension is sufficient to insure a clean break with member 378, without arcing, and to close the light circuit again through contact member 376.

In Figure 4 there is the same general theory of operation. If switch 18 is closed and the brakes are not on, current will flow from battery 26 through lamp 10 and wire 432, by way of wire 430 and binding post 446, through a resilient carrier 464 held by the binding post and by a clamp screw 456, around by a contact member 476 on carrier 462, through vibrator 470 and binding post or clamp screw 472 to the ground 448.

Depression of the brake pedal causes plunger 374 to move toward the left a threeply blade made up of a conductor 462 and a conductor 464 separated by insulation 466, in such a manner as to move contact member 476 to break its contact, and to move a second contact member 482 to establish contact with vibrator 470. Members 476 and 482 are insulated from each other, the former being in electrical connection with conductor 464 and the latter with conductor 462. At the same time plunger 374 is itself a contact member, being connected to a wire 452 shunted around switch 18.

The current now passes directly from the battery 26 to binding post 478, through a nichrome wire 468 which holds the vibrator toward the right but is insulated therefrom, and which is adjusted by a setscrew 465, then by way of conductor 462 and contact member 482 to vibrator 470 and thence through binding post 472 to the ground 448. The light circuit at this time is broken between contact member 476 and vibrator 470, and the light is off. A heavy current flows, heating wire 468 and causing it to expand, thus releasing vibrator 470 and causing it to reestablish the light circuit and break the shunt circuit.

While several illustrative embodiments of my invention have been described in detail, it is not my intention to limit its scope to those embodiments, or in all its phases to the control of a tail light as distinguished from the head lights or other lights, or otherwise than by the terms of the appended claims.

I claim:

1. In a signaling system for use on vehicles, in combination, a source of electrical energy, a signal lamp, a conducting path of relatively high resistance between the source and the lamp, a circuit in series with said path and source and in parallel with said lamp, and operator-controlled means for changing the resistance in said parallel circuit to effect a change in the voltage applied to the lamp and consequent change in the intensity of illumination thereof, the resistance of said path serving to prevent short-circuiting of the source when the parallel circuit is closed.

2. In the combination as defined in claim 1, a manually operated switch in said firstnamed path, a shunt about the switch, a switch in the shunt, and means operated by said operator-controlled means for closing said switch.

3. In a signaling system for automobiles, in combination, a source of electrical energy, a signal lamp, a conducting path of relatively high resistance between the source and the lamp, a circuit in series with said path and source and in parallel with said lamp, and means for intermittently varying the resistance in said parallel circuit to effect corresponding variations in the voltage applied to the lamp and consequent variations in the intensity of illumination thereof, the resistance of said path serving to prevent short-circuiting of the source when the parallel circuit is closed.

4. In a signaling system for use on vehicles, in combination, a source of electrical energy, a signal light, a conducting path of relatively high resistance between the source and the light, a circuit in series with said path and in parallel with said lamp, means in said parallel circuit for intermittently varying the resistance thereof to effect corresponding variations in the voltage applied to the lamp and consequent variations in the intensity of illumination thereof, the resistance of said path serving to prevent short-circuiting of the source when the parallel circuit is closed, and a switch in said last-named circuit.

5. In the combination as defined in claim 4, a switch in said path, a shunt about said switch, a switch in said shunt, and means for simultaneously closing said last-named switch and the switch in said parallel circuit.

6. In a signaling system for automobiles, a source of electrical energy, a signal lamp, a conducting path of relatively high resistance between the source and the lamp, a circuit in series with said path and source and in parallel with said lamp, and an interrupter in said parallel circuit including a thermal element normally forming part of said parallel circuit for effecting variations in the voltage applied to the lamp and consequent variations in the intensity of illumination thereof, the resistance of said path serving to prevent short-circuiting of the source when the parallel circuit is closed.

7. In an automobile having a control member and a signal light, a source of electrical energy, a conducting path of relatively high resistance between the source and the lamp, a circuit in series with said path and source and in parallel with said lamp, means in said last-named circuit for intermittently varying the resistance thereof to effect corresponding variations in the voltage applied to the lamp and consequent variations in the intensity of illumination thereof, and means operated by said control member for closing said parallel circuit.

8. In a signaling system for automobiles, in combination, a source of electrical energy, a signal lamp, a conducting path of relatively high resistance between the source and the lamp, a circuit in series with said path and source and in parallel with said lamp, means for intermittently varying the resistance in said parallel circuit to effect corresponding variations in the voltage applied to the lamp and consequent variations in the intensity of illumination thereof, the resistance of said path serving to prevent short-circuiting of the source when the parallel circuit is closed, an operator controlled switch in said path and an operator controlled switch in said parallel circuit whereby when the first switch is closed and the second switch is open the lamp burns steadily, and when both switches are closed the lamp is intermittently flashed.

9. In a signaling system for automobiles, a source of electrical energy, a signal lamp, a conducting path of relatively high resistance between the source and the lamp, a circuit in series with said path and source and in parallel with said lamp, and an interrupter in said parallel circuit including a thermal element normally forming part of said parallel circuit for effecting variations in the voltage applied to the lamp and consequent variations in the intensity of illumination thereof, the resistance of said path serving to prevent short-circuiting of the source when the parallel circuit is closed, an operator controlled switch in said path and an operator controlled switch in said parallel circuit whereby when the first switch is closed and the second switch is open the lamp burns steadily, and when both circuits are closed the lamp is intermittently flashed.

In testimony whereof I affix my signature.

MARSHALL H. PEACOCK.